UNITED STATES PATENT OFFICE.

HANNA KOORIE, OF NEW YORK, N. Y.

HAIR-TONIC.

SPECIFICATION forming part of Letters Patent No. 606,723, dated July 5, 1898.

Application filed February 10, 1897. Serial No. 622,742. (No specimens.)

*To all whom it may concern:*

Be it known that I, HANNA KOORIE, a citizen of the United States, residing at New York, in the county of New York and State of New York, have invented certain new and useful Improvements in Composition of Matter; and I do hereby declare the following to be a full, clear, and exact description of the invention, such as will enable others skilled in the art to which it appertains to make and use the same.

My invention relates to an improvement in compositions for promoting the growth of hair; and it consists in a compound composed of garlic-water and ashes of date-seeds and of English walnuts, which are made into a paste and rubbed thoroughly into the roots of the hair, as will be more fully described hereinafter.

In making my compound I take of ashes of date-seeds one and one-fourth pounds, ashes of English walnuts or Asiatic nut one and one-fourth pounds, and garlic-water five-eighths of a pound. These ingredients are mixed together and form a pasty compound, which is applied to the head and thoroughly rubbed into the roots of the hair.

Having thus described my invention, I claim—

A compound for promoting the growth of the hair, consisting of the ashes of date-seeds and of English walnuts, and garlic-water, in or about the proportions set forth.

In testimony that I claim the invention set forth above I have hereunto set my hand this 19th day of December, 1896.

HANNA KOORIE.

Witnesses:
 OSCAR A. MICHEL,
 H. THOMAS CHARCHAFJIAN.